US006529153B1

(12) United States Patent
Dijkstra

(10) Patent No.: US 6,529,153 B1
(45) Date of Patent: Mar. 4, 2003

(54) HIGH END POLICE RADAR DETECTOR SYSTEM

(76) Inventor: Patrick Dijkstra, Elzenlaan 4, 3465TJ, Driebruggen (NL)

( * ) Notice: Subject to any disclaimer, the term of this patent is extended or adjusted under 35 U.S.C. 154(b) by 0 days.

(21) Appl. No.: 09/906,028

(22) Filed: Jul. 13, 2001

Related U.S. Application Data

(63) Continuation-in-part of application No. 09/759,482, filed on Jan. 12, 2001.

(51) Int. Cl.[7] .................................................. G01S 7/40

(52) U.S. Cl. ..................... 342/20; 342/13; 343/700 MS

(58) Field of Search ............................. 342/13, 14, 15, 342/16, 17, 18, 19, 20, 175, 95, 195, 89–94, 98–103; 343/711–717, 700 MS

(56) References Cited

U.S. PATENT DOCUMENTS 4,625,210 A * 11/1986 Sagl ............................ 342/20
4,630,054 A * 12/1986 Martinson .................... 342/20
5,430,369 A * 7/1995 Bolomey et al. ............. 342/95
5,512,911 A * 4/1996 Oprea ................. 343/700 MS
6,271,798 B1 * 8/2001 Endo et al. ................. 343/713

FOREIGN PATENT DOCUMENTS

EP 06828382 A2 * 11/1995 ............ H01Q/9/04

* cited by examiner

*Primary Examiner*—Bernarr E. Gregory

(57) ABSTRACT

A radar detector system comprises a multi-band patch antenna assembly. The multi-band antenna assembly includes a plurality of patch antennas. Each patch antenna is adapted to receive a radar signal at a specific frequency band. Each patch antenna is further adapted to receive a radar signal in response thereto provide patch antenna output signals. Each patch antenna has a plurality of patches. The patches increase electronic gain. The patch antenna assembly also includes a combining network to receive the patch antenna output signals and then create and forward a single patch antenna assembly output signal.

8 Claims, 2 Drawing Sheets

HIGH END POLICE RADAR DETECTOR SYSTEM

This application is a CIP of Ser. No. 09/759,482, filed Jan. 12, 2001.

BACKGROUND OF THE INVENTION

1. Field of the Invention

The present invention relates to a high end police radar detector system and more particularly pertains to increasing radar reception sensitivity while reducing falsing.

2. Description of the Prior Art

The use of radar detectors of known designs and configurations is known in the prior art. More specifically, radar detectors of known designs and configurations previously devised and utilized for the purpose of improving radar reception through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,977,884 to Ross discloses a radar detector responsive to vehicle speed. Additionally, Japanese Patent Number JP09027096 to Shinichi discloses a speed excess alarming device. The subject matter of these patents is incorporated herein by reference.

While these devices fulfill their respective, particular objectives and requirements, the aforementioned patents do not describe a high end police radar detector system that allows increasing radar reception sensitivity while reducing falsing.

In this respect, the high end police radar detector system according to the present invention substantially departs from the conventional concepts and designs of the prior art, and in doing so provides an apparatus primarily developed for the purpose of increasing radar reception sensitivity while reducing falsing.

Therefore, it can be appreciated that there exists a continuing need for a new and improved high end police radar detector system which can be used for increasing radar reception sensitivity while reducing falsing. In this regard, the present invention substantially fulfills this need.

SUMMARY OF THE INVENTION

In view of the foregoing disadvantages inherent in the known types of radar detectors of known designs and configurations now present in the prior art, the present invention provides an improved high end police radar detector system. As such, the general purpose of the present invention, which will be described subsequently in greater detail, is to provide a new and improved high end police radar detector system and method which has all the advantages of the prior art and none of the disadvantages.

To attain this, the present invention essentially comprises a multi-band patch antenna assembly. The multi-band patch antenna assembly includes a plurality of patch antennas. Each patch antenna is adapted to receive a police radar signal at a specific frequency band and provide patch antenna output signals in response. Each patch antenna has a plurality of patches to increase electronic gain. The patch antenna assembly also includes a combining network to receive the patch antenna output signals and then create and forward a single patch antenna assembly output signal. The multi-band patch antenna assembly has the advantage over a normal horn antenna design in that it is only sensitive for the frequency bands of interest. In this manner, the chance for de-sensitivity of the receiver by strong out-of-band signals is reduced. Falsing caused by out-of-band signals entering a first mixer is also reduced in this manner. The multi-band patch antenna assembly constitutes a significant advantage over conventional horn antennas due to its much smaller thickness. This provides for the mounting of the multi-band patch antenna assembly in small spaces usually available in vehicles. Further provided is a receiver front end assembly. The receiver front end assembly includes a low noise amplifier (LNA). The low noise amplifier is adapted to function both as an amplifier and as a directional filter. The low noise amplifier is adapted to receive the patch assembly output signal. The front end assembly also includes a first mixer. The front mixer is adapted to receive the signals from the low noise amplifier and the signal of a first local oscillator. A first intermediate frequency (IF) signal is then generated. The first mixer is a fundamental mixer being used instead of a harmonic mixer in order to reduce conversion losses of the first mixer. The front end assembly also includes a first local oscillator. The first local oscillator consists of an oscillator operated at one third of the required first local oscillator frequency. The first local oscillator also consists of a tripler. The tripler multiplies the frequency of the oscillator by a factor of 3. The tripler is adapted to amplify the required first local oscillator signal to a high output amplitude. The high output amplitude serves as an input signal to the first mixer, which is required to achieve low conversion losses of the first mixer. The receiver front end assembly also includes a first intermediate frequency filter. The first intermediate frequency filter is adapted to receive the output signal from the first mixer. The first intermediate filter also provides a receiver front end assembly output signal. The receiver front end assembly output signal is provided to a final receiver and detection module. The first intermediate frequency signal is typically above 4 GHz to assure unwanted signals from mobile phones and wireless networks and the like do not enter the first intermediate frequency filter to cause false alarms. The low noise amplifier is located in advance of a first mixer in order to overcome the losses of the first mixer. Reception sensitivity is increased and, in addition, reduction of unwanted antenna radiation of the oscillator and its harmonics normally leaking out of the first mixer by forming a directional filter for signals traveling from the oscillator and first mixer towards the patch antenna. An amplifier is formed for the wanted signals traveling from the patch antennas through the low noise amplifier to the fundamental mixer. Last provided is a final receiver and detection module. The final receiver and detection module detect the received output signal from the receiver front end assembly. The final receiver and detection module also generate an alarm signal in response to received police radar signals.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved high end police radar detector system which has all of the advantages of the prior art radar detectors of known designs and configurations and none of the disadvantages.

It is another object of the present invention to provide a new and improved high end police radar detector system which may be easily and efficiently manufactured and marketed.

It is further an object of the present invention to provide a new and improved high end police radar detector system which is of durable and reliable constructions.

An even further object of the present invention is to provide a new and improved high end police radar detector system which is susceptible of a low cost of manufacture with regard to both materials and labor, and which accordingly is then susceptible of low prices of sale to the consuming public, thereby making such high end police radar detector system economically available to the buying public.

Even still another object of the present invention is to provide a high end police radar detector system for increasing radar reception sensitivity while reducing falsing.

Lastly, it is an object of the present invention to provide a new and improved radar detector system comprising a multi-band patch antenna assembly. The multi-band antenna assembly includes a plurality of patch antennas. Each patch antenna is adapted to receive a radar signal at a specific frequency band. Each patch antenna is further adapted to receive a radar signal in response thereto provide patch antenna output signals. Each patch antenna has a plurality of patches. The patches increase electronic gain. The patch antenna assembly also includes a combining network to receive the patch antenna output signals and then create and forward a single patch antenna assembly output signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
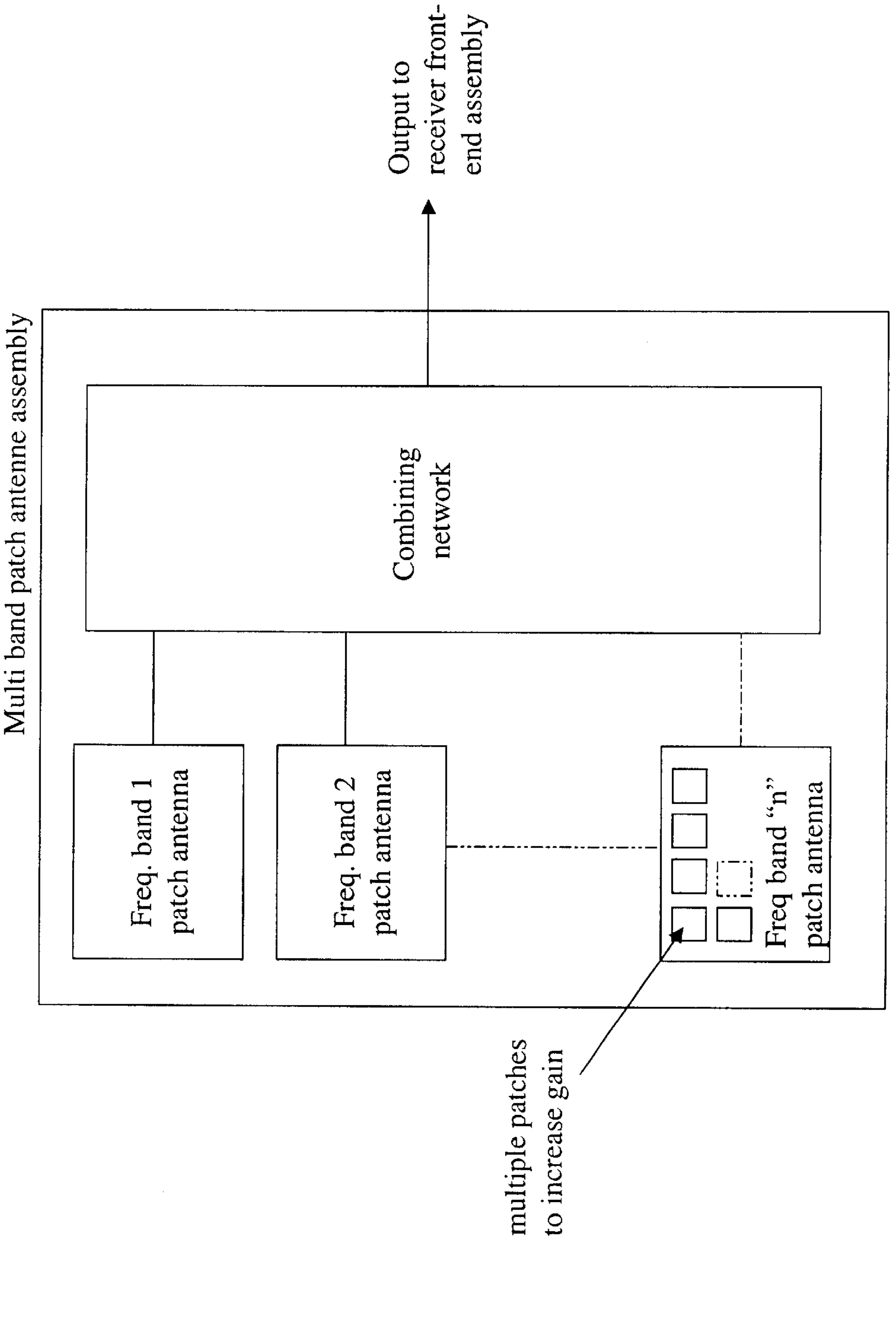
FIG. 1 is an electrical schematic illustration of the multi band patch antenna assembly of the high end police radar detector system constructed in accordance with the principles of the present invention.
Figure 2:
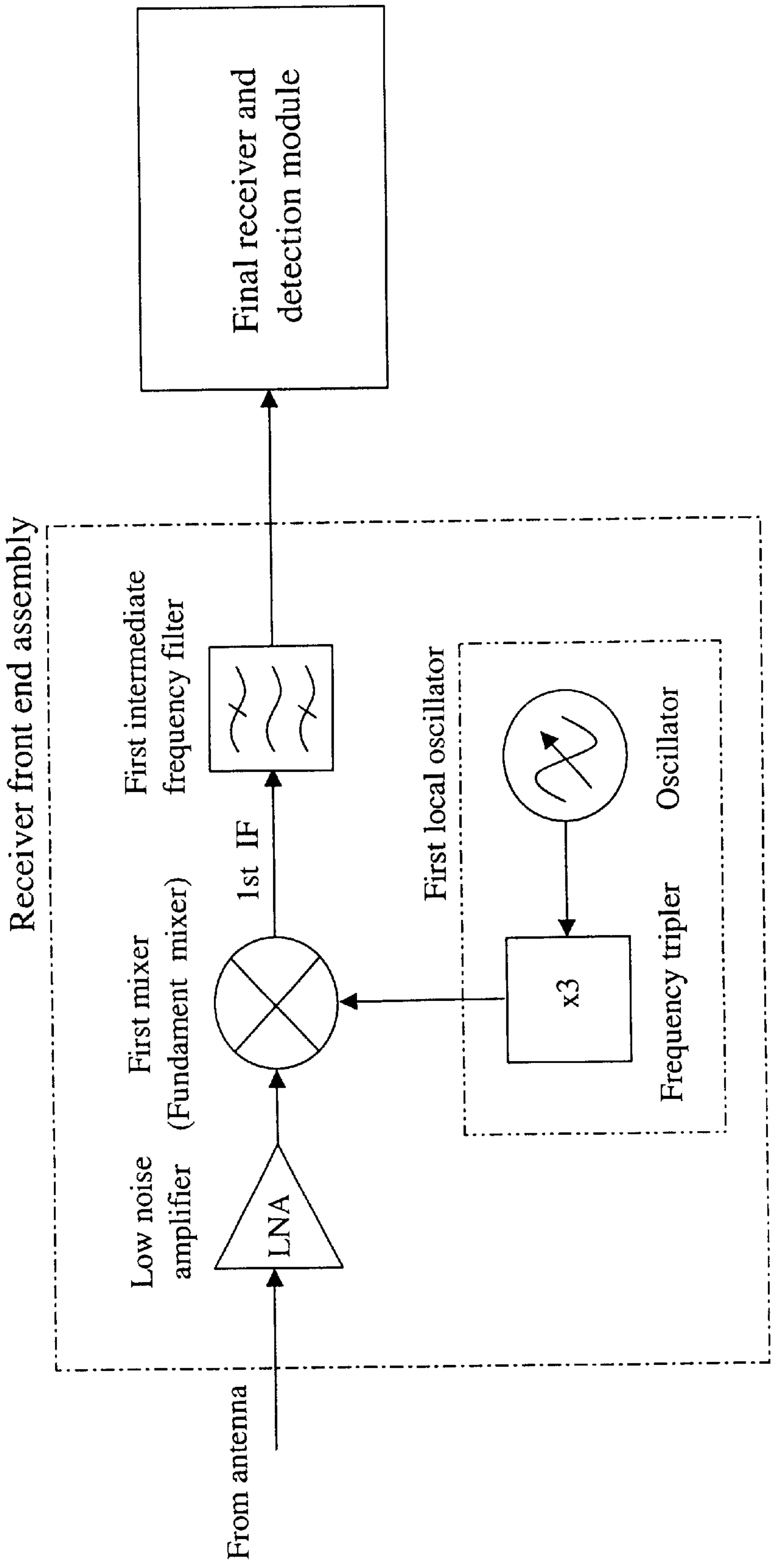
FIG. 2 is an electrical schematic illustration of the receiver front end assembly and final receiver and detection module of the high end police radar detector system.

With reference now to the drawings, and in particular to FIG. 1 thereof, the preferred embodiment of the new and improved high end police radar detector system embodying the principles and concepts of the present invention.

The present invention, the high end police radar detector system is comprised of a plurality of components. Such components in their broadest context include a plurality of patch antennas. Such components are individually configured and correlated with respect to each other so as to attain the desired objective.

First provided is a multi-band patch antenna assembly. The multi-band patch antenna assembly includes a plurality of patch antennas. Each patch antenna is adapted to receive a police radar signal at a specific frequency band and provide patch antenna output signals in response. Each patch antenna has a plurality of patches to increase electronic gain. The patch antenna assembly also includes a combining network to receive the patch antenna output signals and then create and forward a single patch antenna assembly output signal. The multi-band patch antenna assembly has the advantage over a normal horn antenna design in that it is only sensitive for the frequency bands of interest. In this manner, the chance for de-sensitivity of the receiver by strong out-of-band signals is reduced. Falsing caused by out-of-band signals entering a first mixer is also reduced in this manner. The multi-band patch antenna assembly constitutes a significant advantage over conventional horn antennas due to its much smaller thickness. This provides for the mounting of the multi-band patch antenna assembly in small spaces usually available in vehicles.

Further provided is a receiver front end assembly. The receiver front end assembly includes a low noise amplifier (LNA). The low noise amplifier is adapted to function both as an amplifier and as a directional filter. The low noise amplifier is adapted to receive the patch assembly output signal. The front end assembly also includes a first mixer. The front mixer is adapted to receive the signals from the low noise amplifier and the signal of a first local oscillator. A first intermediate frequency (IF) signal is then generated. The first mixer is a fundamental mixer being used instead of a harmonic mixer in order to reduce conversion losses of the first mixer. The front end assembly also includes a first local oscillator. The first local oscillator consists of an oscillator operated at one third of the required first local oscillator frequency. The first local oscillator also consists of a tripler. The tripler multiplies the frequency of the oscillator by a factor of 3. The tripler is adapted to amplify the required first local oscillator signal to a high output amplitude. The high output amplitude serves as an input signal to the first mixer, which is required to achieve low conversion losses of the first mixer. The receiver front end assembly also includes a first intermediate frequency filter. The first intermediate frequency filter is adapted to receive the output signal from the first mixer. The first intermediate filter also provides a receiver front end assembly output signal. The receiver front end assembly output signal is provided to a final receiver and detection module. The first intermediate frequency signal is typically above 4 GHz to assure unwanted signals from mobile phones and wireless networks and the like do not enter the first intermediate frequency filter to cause false alarms. The low noise amplifier is located in advance of a first mixer in order to overcome the losses of the first mixer. Reception sensitivity is increased and, in addition, reduction of unwanted antenna radiation of the oscillator and its harmonics normally leaking out of the first mixer by forming a directional filter for signals traveling from the oscillator and first mixer towards the patch antenna. An amplifier is formed for the wanted signals traveling from the patch antennas through the low noise amplifier to the fundamental mixer.

Last provided is a final receiver and detection module. The final receiver and detection module detect the received output signal from the receiver front end assembly. The final receiver and detection module also generate an alarm signal in response to received police radar signals.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A police radar detector system with increased reception sensitivity and reduced false alarms comprising, in combination:

a plurality of patch antennas with each patch antenna configured to receive a specific radio frequency band and transmit the received frequency as an output signal, with each patch antenna comprising a plurality of patches effectively increasing received electronic signal gain, the patch antenna assembly also comprising a combining network to receive the patch antenna output signals from the plurality of patch antennas and then create and transmit a single output signal;

the multi-band patch antenna assembly being sensitive to specific frequency bands with said frequency specificity reducing the chance for de-sensitivity of the receiver by strong out-of-band signals and said specificity also reducing false signals caused by out-of-band signals entering a first mixer, with the multi-band patch antenna assembly configuration having a smaller size than a conventional horn antenna allowing easy mounting of the multi-band patch antenna assembly in small spaces usually available in vehicles;

a receiver assembly including a low noise amplifying directional filter (LNA) with the low noise amplifying directional filter electronically coupled to the patch assembly receive the patch assembly output signal;

the receiver assembly also including a first fundamental mixer, electronically coupled to the LNA and to a local oscillator to receive the signal from the low noise amplifier and the signal from a first local oscillator, the mixer then generating a first intermediate frequency (IF) signal, the first fundamental mixer reducing conversion losses of the first mixer, the assembly also including a first local oscillator with the first local oscillator comprising an oscillator operated at about one third of the required first local oscillator frequency and a tripler which multiplies the frequency of the oscillator by a factor of 3, the tripler amplifying the required first local oscillator signal to a high output amplitude to serve as an input signal to the first mixer, thereby achieving low conversion losses of the first mixer signal;

the receiver assembly also including a first intermediate frequency filter (IFF), electronically coupled to the first mixer to receive the output signal from the first mixer and to provide a receiver assembly output signal to a final receiver and detection module, the first intermediate frequency signal typically being above 4 GHz to prevent the interference from unwanted signals from causing a false alarm;

the low noise amplifier (LNA) being located in advance of the first mixer thereby overcoming the losses of the first mixer and thereby increasing reception sensitivity and, in addition, such placement reducing unwanted antenna radiation of the oscillator and the oscillator's associated harmonics that normally leak out of the first mixer by the LNA forming a directional filter for signals traveling from the oscillator and first mixer towards the patch antennas with the LNA also forming an amplifier for the wanted received signals traveling from the patch antennas through the low noise amplifier (LNA) to the fundamental mixer; and, a final receiver and detection module electronically coupled to the first intermediate frequency filter to detect the received output signal from the receiver assembly and generate an appropriate alarm signal in response to received police radar signals.

2. A police radar detector system comprising a multi-band patch antenna assembly including a plurality of patch antennas with each patch antenna configured to receive a radio frequency signal at a specific band frequency and in response thereto to provide a patch antenna output signal, with each patch antenna having a plurality of patches to effectively increase the electronic gain of the received signal, the patch antenna assembly also including a combining network to receive a patch antenna output signal and then create and forward a single patch antenna assembly output signal.

3. A radar detection system as set forth in claim 2 and further including a receiver assembly including an amplifying directional filter, the low noise amplifier electronically coupled to the patch antenna assembly to receive the patch assembly output signal.

4. A radar detection system as set forth in claim 2 wherein the receiver assembly also includes a first fundamental mixer which is electronically coupled to, and receives a signal from the low noise amplifier and a signal from a first local oscillator and thereby generating a first intermediate frequency signal.

5. A radar detection system as set forth in claim 2 wherein the system also includes a first local oscillator, the first local oscillator operating at a reduced oscillator frequency and an oscillator multiplier which multiplies the frequency of the oscillator by a factor, the multiplier electronically coupled to and amplifying the first local oscillator signal to a high output amplitude to serve as an input signal to a mixer.

6. A radar detection system as set forth in claim 2 wherein the receiver assembly also includes a first intermediate frequency filter electronically coupled with the first mixer to receive an output signal from the first mixer and then provide a receiver assembly output signal to a final receiver and detection module.

7. A radar detection system as set forth in claim 2 wherein the system further includes a final receiver and detection module with the module functioning to detect a received output signal from the receiver assembly and the module then generating an alarm signal in response to a received radar signal.

8. A radar detection system as set forth in claim 2 comprising an antenna and a receiver assembly, with the receiver assembly including a low noise amplifying directional filter, the low noise amplifier being adapted to receive an output signal from the antenna.

* * * * *